United States Patent Office 2,889,243
Patented June 2, 1959

2,889,243
VIRUCIDAL COMPOSITIONS AND METHOD

Gerald E. Underwood, Charleston Township, Kalamazoo County, and Samuel J. Musser, Kalamazoo Township, Kalamazoo County, Mich., assignors to The Upjohn Company, Kalamazoo, Mich., a corporation of Michigan No Drawing. Application April 30, 1956
Serial No. 581,323

7 Claims. (Cl. 167—22)

The present invention relates to novel chemical compositions having antiviral activity, particularly virucidal activity, and methods for their application, which compositions contain as the active ingredient a hydroxypyruvaldehyde ether, which term is defined in the present specification and claims as meaning compounds of the structural formula

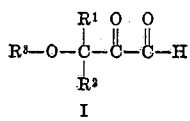

I wherein $R^1$ and $R^2$ are selected from hydrogen and lower-alkyl [$C_nH_{2n+1}$—] containing from one to three carbon atoms, inclusive [$n$ being an integer from one to three, inclusive], and $R^3$ is selected from lower-alkyl-, (lower-alkoxy) - (lower -alkylene)-, (lower - alkoxy) - (lower-alkylenoxy)-(lower-alkylene)-, and lower-alkanoyl-, in which the radicals lower-alkyl [$C_nH_{2n+1}$—], lower-alkoxy [$C_nH_{2n+1}$—O—], lower-alkylene [—$C_nH_{2n}$—], lower-alkylenoxy [$C_nH_{2n}O$—], and lower-alkanoyl

[$C_{n-1}H_{2n-1}CO$—]

each contain from one to six carbon atoms, inclusive [the foregoing symbol $n$ being an integer from one to six, inclusive]; and sodium and potassium bisulfite addition compounds thereof. The hydroxypyruvaldehyde ether active ingredients (defined above) of most interest are the low-molecular-weight hydroxypyruvaldehyde ethers, which term is used in the present specification and claims is defined as compounds of the foregoing structural Formula I wherein $R^1$ and $R^2$ are selected from hydrogen [H—], and methyl [$CH_3$—], and $R^3$ is selected from methyl [$CH_3$—], ethyl [$CH_3CH_2$—], propyl

[$CH_3CH_2CH_2$—]

isopropyl [$(CH_3)_2CH$—], methoxy-ethylene

[$CH_3O$—$CH_2CH_2$—]

methoxy-methylenoxy-ethylene

[$CH_3O$—$CH_2O$—$CH_2CH_2$—]

and acetyl [$CH_3CO$—]; and sodium and potassium bisulfite addition compounds thereof. The hydrates of the foregoing active ingredient compounds also are included within the scope of the present invention.

The novel compositions of the present invention, containing the above-defined active ingredient which has been discovered to have virucidal activity, are of two basic types designated as compositions A and B. Composition A comprises (1) active ingredient, (2) fluid carrier being a liquid or gas, and (3) surface-active agent. Composition B comprises (1) active ingredient and (2) solid carrier, preferably with a surface-active agent added. When the fluid carrier in composition A is a sterile aqueous solvent, the addition of a surface-active agent is preferred but not required. Suitably the compositions can be used in the solid state, e.g. as a dust, powder, granule, pellet, tablet, etc., in the liquid state, e.g. as a solid-in-liquid suspension or solution or a liquid-in-liquid emulsion or solution, as an aerosol of solid or liquid in a propellant gas, or in the gaseous state.

The antiviral compositions of the present invention are particularly useful for killing viruses other than when present in the normal virus-host relationship in animals. They are particularly useful for virus prophylaxis and decontamination of materials and areas. For example, viruses such as Newcastle's virus can be substantially eliminated from poultry-growing areas contaminated with such viruses by application of the compositions of the present invention. Uncontaminated poultry-growing areas can be treated with the present compositions as a prophylactic measure to prevent virus contamination. Similarly sick rooms, hospital equipment such as surgical instruments, etc. can be maintained substantially free of the many possible contaminating viruses, e.g. influenza, mumps, hepatitis, measles, etc. viruses, by application of the present compositions, composition A being most useful for this purpose when the fluid carrier is sterile aqueous solvent, with or without surface-active agent. The compositions of the present invention are suitable for the virus decontamination of any virus-infected geographical area, small or large, e.g. as would be present in biological warfare employing viruses. Paper, cloth, wood, etc. can be treated with the present compositions as a prophylactic measure to prevent virus contamination. Other uses of the antiviral compositions of the present invention will be apparent to one skilled in the art. Efficacy of the present antiviral compositions is illustrated by Table I which shows the typically superior results of representative active ingredient compounds of this invention obtained in the well-known in ovo survival test for antiviral potency, employing Newcastle's virus (NJ-KD strain) and influenza A virus (PR8 strain) as illustrative viruses. In the test method used to obtain the data in Table I any particular test compound, i.e. active ingredient, is dissolved in water or suspended in water-carboxymethyl cellulose, depending on the degree of water solubility. A known volume of such a solution or suspension containing a known concentration of the test compound is injected into the allantoic sac of ten-day fertile eggs, using the technique described by Beveridge and Burnet, Medical Research Council, Special Report Series No. 256, "The Cultivation of Viruses and Rickettsiae in the Chick Embryo," London, His Majesty's Stationery Office, 1946. The test compound is usually administered at or slightly less than the maximum tolerated dose, i.e. the greatest amount which when similarly administered is found to cause no deaths in similar eggs during a 216-hour incubation period. The same volume of the same menstruum without test compound is injected into similar eggs, as a control. About fifteen minutes later all eggs, test and control, are inoculated with a virus suspension containing approximately fifty times the $LD_{50}$ dosage of virus; one $LD_{50}$ is that amount which kills fifty percent of virus-infected embryonated eggs. The eggs are incubated at 37 degrees centigrade. Survivorship is determined by candling the eggs at eight-hour intervals during a 216-hour period. The protection afforded by a test compound is conveniently expressed thus: percent survivorship of treated eggs after 216 hours (e.g. ninety percent) minus percent survivorship of control eggs after 216 hours (e.g. five percent) equals the protective index (e.g. 85), the maximum protective index value being 100. The test compounds listed in Table I, therefore, are highly potent antiviral agents.

An object of the present invention is to provide novel chemical compositions having antiviral activity, particularly virucidal activity, and methods for the application of such compositions. Another object of the present in-

TABLE I

| Test Compound | | Protective Index | |
|---|---|---|---|
| Formula | Milligrams per egg | Newcastle's Virus | Influenza A Virus |
| $CH_3O—CH_2—CO—CHO$ | 2.0 | 99, 92 | |
| $CH_3—CH_2—CO—CHO·H_2O$ | 2.0 | 90, 71 | |
| $C_2H_5O—CH_2—CO—CHO$ | 4.0 | | 90 |
| | 4.7 | 99, 99 | 96, 84 |
| $C_2H_5O—CH_2—CO—CHO·NaHSO_3$ | 1.0 | 64 | 48 |
| $CH_3O—CH(CH_3)—CO—CHO$ | 2.3 | 99, 99 | |
| | 3.0 | | 83 |
| $CH_3O—CH(CH_3)—CO—CHO·H_2O$ | 2.0 | 99, 92 | 74 |
| $CH_3O—CH(CH_3)—CO—CHO·NaHSO_3$ | 4.0 | 99, 98 | 64 |
| $C_2H_5O—CH(CH_3)—CO—CHO$ | 4.7 | 99, 96 | |
| | 2.9 | 99, 81 | 99, 81 |
| $C_2H_5O—CH(CH_3)—CO—CHO·H_2O$ | 4.0 | 99 | |
| | 5.0 | 89 | |
| $C_2H_5O—CH(CH_3)—CO—CHO·NaHSO_3·H_2O$ | 4.0 | 90, 97 | |
| | 6.0 | 99, 97 | 86, 61 |
| $(CH_3)_2CHO—CH(CH_3)—CO—CHO$ | 2.0 | 99, 96 | |
| $C_3H_7O—C(CH_3)_2—CO—CHO$ | 16.0 | 94, 90 | 80 |
| $CH_3CO_2—CH(CH_3)—CO—CHO$ | 0.36 | | 82 |
| | 4.0 | 99, 88 | |
| $CH_3OCH_2CH_2O—CH(CH_3)—CO—CHO$ | 4.0 | | 93 |
| | 4.7 | 81 | |
| $CH_3OCH_2CH_2O—CH(CH_3)—CO—CHO·H_2O$ | 8.0 | 98, 96 | 71 |
| $CH_3OCH_2CH_2O—CH(CH_3)—CO—CHO·NaHSO_3$ | 6.0 | 99, 99 | 72 |
| $CH_3OCH_2OCH_2CH_2O—CH(CH_3)—CO—CHO$ | 0.16 | 87, 83 | 84 | vention is to provide novel compositions having virucidal activity and containing as the active ingredient previously defined a hydroxypyruvaldehyde ether and more particularly a low-molecular-weight hydroxypyruvaldehyde ether, and novel processes for the application of these compositions. A further object of this invention is to provide antiviral compositions comprising (1) active ingredient as defined previously and (2) an additional ingredient selected from (a) fluid carrier plus surface-active agent and (b) solid carrier. An additional object of the present invention is to provide virucidal compositions having the specific utilities stated above, as well as other utility as antivral agents. Other objects of the present invention will be apparent to one skilled in the art.

Representative active ingredient compounds of the present novel compositions are β-methoxy-α-ketopropionaldehyde, β-ethoxy-α-ketopropionaldehyde, β-(n-propoxy) - α - ketopropionaldehyde, β - (β - methoxyethoxy) - α - ketopropionaldehyde, β - isopropoxy - α - ketopropionaldehyde, β - [β - (methoxymethoxy) - ethoxy] - α - ketopropionaldehyde, β - acetoxy - α - ketopropionaldehyde, β - methoxy - α - ketobutyraldehyde, β - ethoxy - α - ketobutyraldehyde, β - (n - propoxy) - α - ketobutyraldehyde, β - (β - methoxyethoxy) - α - ketobutyraldehyde, β-isopropoxy-α-ketobutyraldehyde, β-[β-(methoxymethoxy) - ethoxy] - α - ketobutyraldehyde, β - acetoxy-α-ketobuhyraldehyde, α-methoxyisopropylglyoxal, α-ethoxy - isopropylglyoxal, α - (n - propoxy) - isopropylglyoxal, α-(β-methoxyethoxy)-isopropylglyoxal, α-isopropoxy - isopropylglyoxal, α - [β - (methoxymethoxy)-ethoxy] - isopropylglyoxal, α - acetoxy - isopropylglyoxal, β-methoxy-β-ethyl-α-ketohexaldehyde, β-ethoxy-β-(n-propyl) - α - ketoisohexaldehyde, β - (n - propoxy) - β-(n-propyl) - α - ketohexaldehyde, β - (β - methoxyethoxy) - α - ketohexaldehyde, α - isopropoxy - isobutylglyoxal, α - [β - (methoxymethoxy) - ethoxy] - (secondary - butyl) - glyoxal, β - acetoxy - β - ethyl - α - ketohexaldehyde, β - (n - butoxy) - α - ketopropionaldehyde, β - (n - amyloxy) - β - (isopropyl) - α - ketohexaldehyde, β - isobutoxy - α - ketobutyraldehyde, α - (n - hexyloxy) - isopropylglyoxal, α - isohexyloxy - isobutylglyoxal, α - propionyloxy - (secondary - butyl) - glyoxal, α-isobutyryloxy - isopropylglyoxal, α - pentanoyloxy - isobutylglyoxal, β - (β - ethoxyethoxy) - β - (n - propyl)-α - ketohexaldehyde, β - (β - propoxyethoxy) - β - (n-propyl) - α - ketoisohexaldehyde, β - (β - butoxyethoxy)-α - ketobutyraldehyde, β - (β - amyloxyethoxy) - α - ketopropionaldehyde, β - (β - hexyloxyethoxy) - β - ethyl - α-ketohexaldehyde, β - (ω - methoxypropoxy) - β - (n-propyl) - α - ketohexaldehyde, β - (ω - methoxybutoxy)-α - ketopropionaldehyde, β - (ω - methoxyamyloxy) - β-isopropyl - α - ketohexaldehyde, β - (β - propoxypropoxy) - β - (n - propyl) - α - ketoisohexaldehyde, α - (β-hexyloxyhexyloxy) - isopropylglyoxal, α - (ω - propoxypropoxy) - (secondary - butyl) - glyoxal, β - (ω - hexyloxyhexyloxy) - β - isopropyl - α - ketohexaldehyde, α-[β - (β - ethoxyethoxy) - ethoxy] - isobutylglyoxal, β-[β - (β - butoxybutoxy) - butoxy] - α - ketopropionaldehyde, and β - [ω - (ω - hexyloxyhexyloxy) - hexyloxy]-α - ketobutyraldehyde; and sodium and potassium bisulfite addition compounds and hydrate derivatives thereof. The active ingredient can be employed in the compositions of the present invention in an amount up to fifty percent by weight or more. However, concentrations of 0.001 percent to ten percent and preferably 0.1 percent to five percent by weight are normally employed.

Typical liquid fluid carriers are water and oils, including those of petroleum, animal, vegetable or synthetic origin, e.g. kerosene, fuel oil, lubricating oil, soy bean oil, linseed oil, castor oil, sperm oil, cod liver oil, etc., particularly those liquid fluid carriers known in the spraying arts, e.g. vegetation spraying, insect spraying, etc. In general water is a suitable, economical, and preferred liquid fluid carrier. Typical gaseous fluid carriers are polyhalogenated hydrocarbons containing one or more fluorine atoms, i.e. the Freons, e.g. the preferred dichlorodifluoromethane ($CCl_2F_2$), i.e. Freon 12, carbon dioxide, nitrogen, propane, etc., particularly those known in the aerosol arts, e.g. insecticide and other pesticide aerosol carriers, etc. Typical solid carriers are clays, e.g. fuller's earth, pyrophyllite, talc, bentonite, kieselguhr, diatomaceous earth, or other clays commercially available in finely divided forms, etc., particularly those which are employed in the art as insecticide and other pesticide carriers. Typical sterile aqueous solvents are sterile water (preferred), sterile isotonic salt (sodium chloride) solution, sterile aqueous ethanol, etc., particularly those sterile aqueous solvents which are known in the art to be useful in sterile disinfectants used for sterilization of surgical instruments and other hospital and medical equipment, supplies, furniture, clothing, etc. Typical surface-active agents (Kirk and Othmer, "Encyclopedia of Chemical Technology," Interscience Publishers, Inc., New York, New York, 1954, volume 13, page 513), particularly emulsifying and dispersing agents, are, e.g. fatty alcohol sulfates such as sodium lauryl sulfate, aliphatic or aromatic sulfonates, such as sulfonated castor oil or the various alkylarylsulfonates such as the sodium salt of monosulfonated nonyl naphthalene, and non-ionic types of emulsifying or dispersing agents such as the high molecular weight alkyl polyglycol ethers or analogous thioethers, such as the decyl, dodecyl, and tetradecyl polyglycol ethers and thioethers containing from 25 to 75 carbon atoms, etc., particularly those surface-active agents known in the pesticide art. These surface-active agents are all of the colloid type; that is to say, they dissolve in water by forming micelles, which are either charged, or neutral depending on whether they are ionic or non-ionic surfactants. In this way they distinguish from ethanol which is completely soluble in water and does not form micelles therein. For purposes of preparing satisfactory emulsions or dispersions an amount of surface-active agent 0.01 percent to five percent by weight of the composition is normally suitable. However, for adjuvant purposes an amount of surface-active agent up to 200 percent or more by weight of the amount of active ingredient can be used. Typical adjuvants which suitably may be added to the fore-described compositions of this invention, particularly the aqueous compositions, are wetting agents and/or humectants. Suitable wetting agents are, e.g. the previously described emulsifying and dispersing agents, and suitable humectants are, e.g. glycerine, diethylene glycol, ethylene glycol, polyethylene glycols in general, glucose, fructose, corn syrup, etc. Other adjuvants may be added to prevent lumping of solid compositions during storage, or to obtain increased coverage or adherence of the composition on application. Likewise fungicides, insecticides, bactericides, and other anti-infective agents, e.g. phenols, creosols, antibiotics, etc., suitably may be added to the compositions of the present invention. Moreover, the compositions of the present invention can be combined with paint compositions which provides paint surface having virucidal properties when applied. The compositions of the present invention are formulated by mixing the active ingredient with the other specified components. Frequently it is preferred to prepare the composition at the place and time of application, particularly if an aqueous liquid carrier is used, in order to avoid transporting and storing large volumes of the compositions, or when the composition is not stable for long periods, or requires reconstitution prior to use. For example, dusts for use in the well-known dusting art can be prepared by grinding solid ingredients together, or grinding separately with subsequent mixing, e.g. by tumbling together, or alternatively, the active material in liquid form, including solutions, emulsions, and suspensions thereof, can be admixed with a finely divided solid carrier in amounts small enough to preserve the requisite free-flowing property of the final dust composition, or excess liquid can be removed by vaporization, e.g. under reduced pressure. The powder can be formed into granules, pellets, tablets, etc., according to procedures well known in the art, if desired, particularly for application of the composition to soil. For liquid compositions applicable by painting or spraying, the active ingredient is dissolved or dispersed in a liquid carrier by agitation, a surface-active agent being included when required as noted above, or when desired. Solid ingredients, particularly if not water-soluble, suitably can be dissolved or suspended in a solvent, and then emulsified with an aqueous liquid carrier. Sterile aqueous compositions of the present invention can be prepared by mixing sterile active ingredient and other sterile ingredient with sterile aqueous solvent under aseptic conditions. Alternatively a non-sterile composition can be prepared and subsequently sterilized. For aerosol compositions, propellant gas fluid carrier is mixed with the other solid or liquid ingredients specified above according to procedures well-known in the aerosol art. Suitably the compositions of the present invention can be used in the gaseous state as fumigant compositions.

The hydroxypyruvaldehyde ether active ingredient compounds of the present invention are prepared by the reaction illustrated by the following equation:

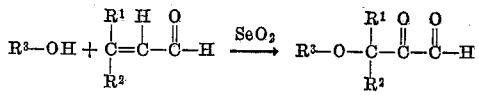

wherein $R^1$, $R^2$ and $R^3$ are as previously defined. Specific illustrative examples of this generally applicable method are given below. However other preparative methods can be used, for example, the generally applicable reaction illustrated by the following equation:

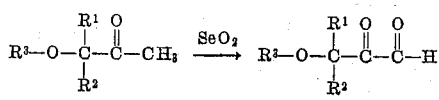

wherein $R^1$, $R^2$ and $R^3$ are as previously defined, Example 3 below being a specific illustrative example of this method.

The following examples are illustrative only and are not to be construed as limiting the scope of the invention.

EXAMPLE 1

In a two-liter, three-necked resin flask equipped with a water-cooled condenser, mechanical stirrer and a dropping funnel, 350 grams (five moles) of crotonaldehyde is boiled under reflux with stirring while a solution of 444 grams (four moles) of selenium dioxide dissolved in 835 grams (eleven moles) of β-methoxyethanol is added during a period of about one hour. The resulting mixture is heated at the boiling point with stirring for four hours, the large aggregate of precipitated selenium being removed when it begins to interfere with the stirring. After standing for sixteen hours at room temperature, the reaction mixture is filtered to remove the remaining selenium. The excess β-methoxyethanol is then removed by distillation under reduced pressure (boiling point 35–37 degrees centigrade at seventeen millimeters pressure) using a fifteen-centimeter Vigreux column, and the remaining product distilled once at nine millimeters pressure and redistilled using a fifteen-centimeter helices-packed column to obtain 235 grams (37 percent of the theoretical amount) of α-keto-β-(β-methoxyethoxy)-butyraldehyde [$CH_3OCH_2CH_2OCH(CH_3)COCHO$] as a yellow-orange fluid oil; boiling point 62–66 degrees centigrade at nine millimeters pressure.

EXAMPLE 2

To 200 grams (2.9 moles) of boiling crotonaldehyde in a one-liter, three-necked, round-bottom flask equipped with stirrer, reflux condenser, and dropping funnel heated in a Glascol mantle is added dropwise 133 grams (1.2 moles) of selenium dioxide dissolved in 425 grams (four moles) of methoxymethoxyethanol. After six hours heating and stirring 68.2 grams (72 percent of the theoretical amount) of selenium is removed by filtration. Excess starting materials are removed by distillation through a fifteen-centimeter Vigreux column, and the α - keto-β-[β-(methoxymethoxy)-ethoxy]-butyraldehyde [$CH_3OCH_2OCH_2CH_2OCH(CH_3)COCHO$] product distilled; boiling point 93–95 degrees centigrade at 0.25 millimeter pressure; $n_D^{20}$ 1.4680.

EXAMPLE 3

To 27.8 grams (0.25 mole) of selenium dioxide in fifty milliliters of dioxane and fifteen milliliters of water is added 32.6 grams (0.25 mole) of 3-ethoxy-3-methyl-butanone-2. The mixture is heated under reflux for two hours and filtered from black selenium. After removal of most of the solvent by distillation through a twelve-inch (one-eighth inch helices) column, the product is dissolved in ether, filtered from more selenium and distilled three times through a six and one-eighth inch helices column. Some colorless forerun and considerable tar are obtained on each distillation. The yield is about seven grams of dark yellow liquid which is about 93 percent pure α-ethoxyisopropylglyoxal

[(CH₃)₂C(OC₂H₅)COCHO]

On the refractometer the index of refraction changes rapidly from about $n_D^{24}$ 1.4490 to $n_D^{24}$ 1.4537 in about one-half hour.

A mixture of 1.37 grams (0.0095 mole) of α-ethoxyisopropylglyoxal in forty milliliters of ethanol and 3.78 grams (0.019 mole) of 2,4-dinitrophenylhydrazine is heated to boiling and one milliliter of concentrated hydrochloric acid is added. After refluxing for one-half hour the mixture is cooled. The product is collected on a filter and dried. The α-ethoxyisopropylglyoxal di-(2,4-dinitrophenylhydrazone) weighs 3.32 grams; melting point about 246–248 degrees centigrade (decomposition).

Analysis.—Calcd. for $C_{19}H_{20}N_8O_9$: C, 45.24; H, 4.00; N, 22.21. Found: C, 44.97, 44.62; H, 3.80, 3.75; N, 22.21, 22.36.

EXAMPLE 4

To 244.5 milliliters of refluxing acrolein (stabilized with hydroquinone) is added with continuous stirring over the course of about one hour a hot solution of 165 grams of selenium dioxide in 300 milliliters of absolute ethanol. The rate of addition of the selenium dioxide solution is determined by the rate of refluxing. The mixture is heated under reflux for an additional five hours and then allowed to stand at room temperature overnight. The red supernatant liquid is decanted from the precipitated selenium and the excess acrolein and ethanol removed by distillation. The dark red residue is distilled in vacuo through a nine-inch Vigreux column. There is obtained 81.6 grams of a mobile yellow liquid boiling at 60–85 degrees centigrade at twenty millimeters pressure. Distillation twice through a thirty-inch column packed with glass helices gives 55 grams of β-ethoxy-α-ketopropionaldehyde [C₂H₅OCH₂COCHO] boiling at 58–59 degrees centigrade at fifteen millimeters pressure.

EXAMPLE 5

To 75 grams (actually 60.6 grams, 0.521 mole) of 80.8 percent (hydrogen peroxide analysis) of β-ethoxy-α-ketopropionaldehyde is added 375 milliliters of deionized water. The colorless solution is extracted three times with fifty-milliliter portions of Skellysolve A (mixture of pentanes and hexanes) and then passed through forty milliliters of Amberlite IR–45 resin (amine-type anion exchange resin) contained in a seventeen-millimeter column (height of resin—approximately eighteen centimeters) over the course of about thirty minutes. The solution is concentrated at <fifty degrees centigrade (water bath temperature) at twenty millimeters pressure to a volume of 142 milliliters. Peroxide titration of this solution shows 0.402 gram/milliliter of β-ethoxy-α-ketopropionaldehyde hydrate. Evaporation of a one-milliliter sample to dryness in vacuo gives a viscous residue which titrates 100 ± two percent β-ethoxy-α-ketopropionaldehyde hydrate [C₂H₅OCH₂COCHO·H₂O].

EXAMPLE 6

Addition of β-ethoxy-α-ketopropionaldehyde to slightly less than one equivalent of freshly prepared sodium bisulfite aqueous solution and concentration of the solution in vacuo, followed by addition of anhydrous ethanol and further evaporation in vacuo gives colorless crystalline β-ethoxy-α-ketopropionaldehyde sodium bisulfite addition compound [C₂H₅OCH₂COCHO·NaHSO₃].

Analysis.—Calcd. for $C_5H_9NaO_6S$: C, 27.27; H, 4.12; Na, 10.44; S, 14.56. Found: C, 26.78; H, 4.22; Na, 10.52; S, 15.28.

EXAMPLE 7

Sodium bisulfite is freshly prepared in aqueous solution by dissolving 5.3 grams (0.05 mole) of sodium carbonate in twenty milliliters of water and passing in sulfur dioxide gas for about forty minutes, at which time the original frothing largely subsides. To this is added a solution of 16.3 grams (0.11 mole) of α-keto-β-ethoxybutyraldehyde hydrate (1,1-dihydroxy-3-ethoxy-2-butanone) in fifteen milliliters of ethanol, and the solution is covered with nitrogen and allowed to stand at room temperature for twenty hours. When no crystallization occurs the water is replaced with ethanol by repeated concentration under reduced pressure at about thirty degrees centigrade followed by addition of ethanol. The tiny white platelets which separate are collected in three fractions, 11.0 grams, 7.0 grams, and 2.0 grams, amounting to twenty grams (85 percent) of α-keto-β-ethoxy-butyraldehyde sodium bisulfite addition compound

[C₂H₅OCH(CH₃)COCHO·NaHSO₃]

Analysis.—Calcd. for $C_6H_{11}NaO_6S$: C, 30.77; H, 4.74; Na, 9.82. Found: C, 31.34, 31.29; H, 5.20, 5.41; Na, 9.93.

EXAMPLE 8

Following the procedure of Example 7, fifty grams of eighty percent pure α-keto-β-methoxybutyraldehyde (actually forty grams, 0.30 mole) is converted to its sodium bisulfite addition compound, giving 29 grams (44 percent). A 1.0 gram sample is recrystallized by dissolving in 0.8 milliliter of water, adding ten milliliters of absolute ethanol, concentrating to two milliliters, adding an additional ten milliliters of absolute ethanol, and concentrating again to five milliliters. When filtered, washed with absolute ethanol, and dried, the fine white crystals which separate amount to 0.7 gram of α-keto-β-methoxybutyraldehyde sodium bisulfite addition compound

[CH₃OCH(CH₃)COCHO·NaHSO₃]

melting point 155–160 degrees centigrade with decomposition (cap.) and requiring 3.02 equivalents of 0.1 N sodium hydroxide for neutralization after oxidation with excess hydrogen peroxide. The theoretical value is 3.00.

Analysis.—Calcd. for $C_5H_9NaO_6S$: C, 27.27; H, 4.12; Na, 10.44. Found: C, 27.49, 26.27; H, 4.59, 4.16; Na, 10.55.

EXAMPLE 9

Following the same procedure as in Example 4, but substituting methanol for ethanol, provides 73.3 grams of α-keto-β-methoxy-propionaldehyde [CH₃OCH₂COCHO] distilling at 57 degrees centigrade at a pressure of nineteen millimeters of mercury.

EXAMPLE 10

Following the procedure of Example 5, using 120 grams of 79 percent pure α-keto-β-(methoxyethoxy)-butyraldehyde (actually 95 grams, 0.59 mole) there is obtained 137 grams of pale yellow aqueous solution, $d_{25}^{25}$ 1.188, containing 75 grams (71 percent) of α-keto-β-(methoxyethoxy)-butyraldehyde monohydrate

[CH₃OCH₂CH₂OCH(CH₃)COCHO·H₂O]

in a concentration of 0.65 gram per milliliter (55 percent by weight). A selenium determination on this indicates between 77 and 155 parts per million. Further concentration of a two-gram sample gives a highly viscous, pale yellow syrup which assays 98 percent monohydrate by the hydrogen peroxide method and contains less than 0.05 milliequivalent of free acid per gram.

EXAMPLE 11

Following the procedure of Example 7, fifty grams of 79 percent pure α-keto-β-(methoxyethoxy)-butyraldehyde (actually forty grams, 0.25 mole) is converted to its sodium bisulfite addition compound, giving 67 grams (84 percent) of fine white crystals. Titration of a sample of α-keto-β-(methoxyethoxy)-butyraldehyde sodium bisulfite addition compound

[CH₃OCH₂CH₂OCH(CH₃)COCHO·NaHSO₃]

after oxidation with excess hydrogen peroxide requires 2.97 equivalents of base per mole, whereas the theoretical value is 3.00.

*Analysis.*—Calcd. for $C_7H_{13}NaO_7S$: C, 31.82; H, 4.96; Na, 8.71. Found: C, 31.50, 31.40; H, 4.99, 4.94; Na, 9.23.

EXAMPLE 12

Following the procedure of Example 5, α-keto-β-ethoxybutyraldehyde is treated with water to provide α-keto-β-ethoxybutyraldehyde hydrate $$[C_2H_5OCH(CH_3)COCHO \cdot H_2O]$$

of 95–97 percent purity.

*Analysis.*—Calcd. for $C_6H_{12}O_4$: C, 48.64; H, 8.17. Found: C, 49.05; H, 8.08.

EXAMPLE 13

Reaction of crotonaldehyde with acetic acid and selenium dioxide according to the general procedure of Example 1 yields α-keto-β-acetoxybutyraldehyde $$[CH_3CO_2CH(CH_3)COCHO]$$

Reaction of the product with water according to the procedure of Example 5 yields α-keto-β-acetoxybutyraldehyde monohydrate, and reaction of the product with sodium bisulfite according to the procedure of Example 7 yields α-keto-β-acetoxybutyraldehyde sodium bisulfite addition compound.

EXAMPLE 14

An aerosol bomb containing five percent by weight of α-keto-β-ethoxybutyraldehyde and 95 percent by weight of Freon 12, the total weight being four ounces, is prepared. The bomb is discharged in a closed room previously occupied by a patient having mumps, care being taken to avoid inhalation by the operator, and the room is kept closed for several hours to achieve virus decontamination. The room is then aired to remove excess aerosol before use. By substituting in the foregoing procedure β-(n-butoxy)-α-ketopropionaldehyde, β-(n-amyloxy)-β-(isopropyl)-α - ketohexaldehyde, β - isobutoxy-α-ketobutyraldehyde, α - (n-hexyloxy)-isopropylglyoxal, α-isohexyloxy-isobutylglyoxal, α-propionyloxy-(secondary-butyl)-glyoxal, α-butyryloxy-(secondary-butyl) - glyoxal, α - isobutyryloxy-isopropylglyoxal, or α-pentanoyloxy-isobutyl-glyoxal for the α-keto-β-ethoxybutyraldehyde, other aerosol bombs useful for the same purpose are prepared.

EXAMPLE 15

A dust is prepared by mixing two parts by weight of α-keto-β-ethoxybutyraldehyde, 0.2 part by weight of sodium lauryl sulfate, and 100 parts by weight of pyrophyllite. This dust is spread over tobacco-growing land which produces tobacco infected with tobacco mosaic virus in order to achieve virus decontamination of the soil. Other dusts suitable for the same purpose are prepared by substituting β-(β-ethoxyethoxy)-β-(n-propyl)-α-ketohexaldehyde, β-(β-propoxyethoxy)-β-(n-propyl)-α - ketoisohexaldehyde, β-(β - butoxyethoxy) - α-ketobutyraldehyde, β-(β - amyloxyethoxy) - α-ketopropionaldehyde, β-(β-hexyloxyethoxy) - β-ethyl-α - ketohexaldehyde, β-(ω-methoxypropoxy)-β-(n-propyl)-α-ketohexaldehyde, β-(ω-methoxybutoxy) - α-ketopropionaldehyde, or β-(ω-methoxyamyloxy)-β-isoropyl-α-ketohexaldehyde for the α-keto-β-ethoxybutyraldehyde in the foregoing procedure.

EXAMPLE 16

A one percent solution of α-keto-β-ethoxybutyraldehyde in sterile water is prepared. Surgical instruments are immersed in this solution at room temperature for about one hour to achieve virus decontamination. Other sterilizing solutions are prepared according to the above procedure by substituting β-methoxy-α-ketopropionaldehyde, β-ethoxy-α-ketopropionaldehyde, β-(n-propoxy)-α-ketopropionaldehyde, β-(β-methoxyethoxy)-α-keto-propionaldehyde, β-isopropoxy-α-ketopropionaldehyde, β-[β-(methoxymethoxy)-ethoxy]-α-ketopropionaldehyde, or β-acetoxy-α-ketopropionaldehyde for the α-keto-β-ethoxybutyraldehyde.

EXAMPLE 17

A sterile aqueous solution containing one percent α-keto-β-ethoxybutyraldehyde and one percent phenol is prepared. Surgical instruments are immersed in this solution for about one hour at room temperature to achieve virus and bacterial decontamination. Sterile solutions containing β-methoxy-α-ketobutyraldehyde, β-(n-propoxy)-α-ketobutyraldehyde, β-(β-methoxyethoxy)-α-keto-butyraldehyde, β-isopropoxy-α-ketobutyraldehyde, β - [β - (methoxy-methoxy) - ethoxy] - α - ketobutyraldehyde, or β-acetoxy-α-ketobutyraldehyde in place of α-keto-β-ethoxybutyraldehyde are prepared by the same procedure and are useful for the same purpose.

EXAMPLE 18

An aqueous solution containing two percent α-keto-β-ethoxybutyraldehyde and 0.1 percent sodium lauryl sulfate is prepared. A dog kennel previously housing a dog suffering from distemper is sprayed or washed with this solution to achieve virus decontamination. Spraying or washing solutions containing α-methoxy-isopropylglyoxal, α - ethoxy - isopropylglyoxal, α - (n-propoxy) - isopropylglyoxal, α-(β-methoxyethoxy)-isopropylglyoxal, α-isopropoxy - isopropylglyoxal, α - [β - (methoxymethoxy)-ethoxy]-isopropylglyoxal, or α-acetoxy-isopropylglyoxal in place of α-keto-β-ethoxybutyraldehyde are prepared by the same procedure.

EXAMPLE 19

An aqueous solution containing five percent α-keto-β-ethoxybutyraldehyde and 0.2 percent sodium lauryl sulfate is prepared. This solution is used for spraying poultry yards known to be contaminated with Newcastles virus to achieve virus decontamination. Other solutions suitable for spraying for the same purpose are obtained by substituting β-methoxy-β-ethyl-α-ketohexaldehyde, β-ethoxy-β-(n-propyl)-α-ketoisohexaldehyde, β-(n-propoxy)-β-(n-propyl)-α-ketohexaldehyde, β-(β-methoxyethoxy)-α-ketohexaldehyde, α-isopropoxy-isobutylglyoxal, α-[β-(methoxymethoxy)-ethoxy]-(secondary-butyl)-glyoxal, or β-acetoxy-β-ethyl-α-ketohexaldehyde for the α-keto-β-ethoxybutyraldehyde in the foregoing process.

EXAMPLE 20

A dust is prepared by thoroughly mixing 100 parts by weight of pyrophyllite and two parts by weight of α-keto-β-ethoxybutyraldehyde sodium bisulfite addition compound. This dust is spread in a fine layer on the floor of a poultry house which is being prepared to receive a brood of young chicks as a prophylactic measure to prevent virus infections. Following the foregoing procedure, but substituting β-(β-propoxypropoxy)-β-(n-propyl)-α-ketoisohexaldehyde, α-(β-hexyloxyhexyloxy)-isopropylglyoxal, α-(ω-propoxypropoxy)-(secondary-butyl)-glyoxal, β-(ω-hexyloxyhexyloxy)-β-isopropyl-α-ketohexaldehyde, α-[β-(β-ethoxyethoxy)-ethoxy]-isobutylglyoxal, β-[β-(β-butoxybutoxy)-butoxy]-α-ketopropionaldehyde, or β-[ω-(ω-hexyloxyhexyloxy)-hexyloxy]-α-ketobutyraldehyde for the α-keto-β-ethoxybutyraldehyde sodium bisulfite addition compound provides other dusts useful for the same purpose.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A virucidal composition comprising α-keto-β-ethoxybutyraldehyde, water, and surface-active agent.

2. A virucidal composition comprising α-keto-β-ethoxybutyraldehyde and sterile water.

3. A virucidal composition which comprises a carrier, a micelle-forming surface-active agent, and an essential active ingredient selected from the class consisting of (1) a compound having the following general structural formula:

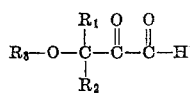

wherein $R_1$ and $R_2$ are members of the class consisting of hydrogen, and lower-alkyl containing from 1 to 3 carbon atoms, inclusive; $R_3$ is selected from the class consisting of lower-alkyl, (lower-alkoxy)-(lower-alkylene)-, (lower-alkoxy)-(lower-alkylenoxy)-(lower-alkylene)-, and lower-alkanoyl-, radicals in which the lower-alkyl, lower-alkoxy, lower-alkylene, lower-alkylenoxy, and lower-alkanoyl groups each contain from one to six carbon atoms, inclusive; (2) sodium and potassium bisulfite addition derivatives thereof; and (3) hydrates thereof.

4. The virucidal composition of claim 3 in which the carrier is water.

5. A virucidal composition comprising sterile water and an essential active ingredient selected from the class consisting of (1) a compound having the following general structural formula:

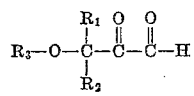

wherein $R_1$ and $R_2$ are members of the class consisting of hydrogen, and lower-alkyl containing from 1 to 3 carbon atoms, inclusive; $R_3$ is selected from the class consisting of lower-alkyl, (lower-alkoxy)-(lower-alkylene)-, (lower-alkoxy)-(lower-alkylenoxy)-(lower-alkylene)-, and lower-alkanoyl-, radicals in which the lower-alkyl, lower-alkoxy, lower-alkylene, lower-alkylenoxy, and lower-alkanoyl groups each contain from one to six carbon atoms, inclusive; (2) sodium and potassium bisulfite addition derivatives thereof; and (3) hydrates thereof.

6. A method for viral prophylaxis which comprises contacting viruses and virus contaminated matter with a compound selected from the class consisting of (1) those having the following general structural formula:

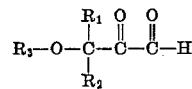

wherein $R_1$ and $R_2$ are members of the class consisting of hydrogen, and lower-alkyl containing from one to three carbon atoms, inclusive; and $R_3$ is selected from the class consisting of lower-alkyl, (lower-alkoxy)-(lower-alkylene)-, (lower-alkoxy)-(lower-alkylenoxy)-(lower-alkylene)-, and lower-alkanoyl-, radicals in which the lower-alkyl, lower-alkoxy, lower-alkylene, lower-alkylenoxy, and lower-alkanoyl groups each contain from one to six carbon atoms, inclusive; (2) sodium and potassium bisulfite addition compounds thereof; and (3) hydrates thereof.

7. A method for viral prophylaxis which comprises contacting viruses and virus contaminated matter with α-keto-β-ethoxybutyraldehyde.

References Cited in the file of this patent

FOREIGN PATENTS 513,926   Canada _____ June 21, 1955

OTHER REFERENCES

Chem. Abst., 35 (1941), p. 3964 (L. Rappen).

UNITED STATES PATENT OFFICE
CERTIFICATE OF CORRECTION

Patent No. 2,889,243                       June 2, 1959

Gerald E. Underwood et al

It is hereby certified that error appears in the printed specification of the above numbered patent requiring correction and that the said Letters Patent should read as corrected below.

Column 3, Table I, second formula thereof, for that portion reading

"$CH_3-CH_2-$" read --- $CH_3O-CH_2-$ ---

Signed and sealed this 6th day of October 1959.

(SEAL)
Attest:

KARL H. AXLINE
Attesting Officer

ROBERT C. WATSON
Commissioner of Patents